(12) United States Patent
Nakamura et al.

(10) Patent No.: US 11,713,809 B2
(45) Date of Patent: Aug. 1, 2023

(54) PARKING LOCK DEVICE

(71) Applicant: TOYOTA JIDOSHA KABUSHIKI KAISHA, Toyota (JP)

(72) Inventors: Ryoto Nakamura, Toyota (JP); Takuya Kodama, Nisshin (JP); Atsushi Teshima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 17/655,535

(22) Filed: Mar. 18, 2022

(65) Prior Publication Data

US 2022/0307597 A1  Sep. 29, 2022

(30) Foreign Application Priority Data

Mar. 23, 2021 (JP) .............................. JP2021-048964

(51) Int. Cl.
*F16H 63/34* (2006.01)

(52) U.S. Cl.
CPC ................................ *F16H 63/3441* (2013.01)

(58) Field of Classification Search
CPC ............. F16H 63/3441; F16H 63/3425; F16H 63/3433
See application file for complete search history.

(56) References Cited

U.S. PATENT DOCUMENTS

| | | | | |
|---|---|---|---|---|
| 4,585,103 A * | 4/1986 | Kuwayama | ............. | B60T 1/005 192/219.5 |
| 4,719,999 A * | 1/1988 | Ohkubo | ............... | F16H 63/3416 192/219.5 |
| 7,731,007 B2 * | 6/2010 | Kusamoto | ........... | F16H 63/3416 192/219.5 |
| 10,895,322 B2 * | 1/2021 | Kimura | ............... | F16H 63/3416 |
| 2011/0015036 A1 * | 1/2011 | Watanabe | ........... | F16H 63/3416 477/92 |
| 2012/0168275 A1 | 7/2012 | Morisawa et al. | | |
| 2013/0134010 A1 * | 5/2013 | Kimura | ............... | F16H 57/0467 192/219.5 |

(Continued)

FOREIGN PATENT DOCUMENTS

| | | | |
|---|---|---|---|
| JP | 5240364 B2 | 7/2013 | |
| WO | WO-2015063583 A1 * | 5/2015 | ......... F16H 63/3416 |

*Primary Examiner* — Lori Wu
(74) *Attorney, Agent, or Firm* — Hunton Andrews Kurth LLP (57) ABSTRACT

A cam guiding device includes a cam guide having a cylindrical portion, a partially cylindrical portion extending from a leading end portion of the cylindrical portion, a partially tapered portion extending from the leading end portion of the cylindrical portion, and a rotation stopper portion provided on the partially cylindrical portion, and a sleeve for accommodating the cam guide. The sleeve includes an arc portion that overlaps the partially cylindrical portion from an outside. A radius of the partially tapered portion increases as the partially tapered portion extends away from the cylindrical portion. The rotation stopper portion is a component that protrudes radially outward from an outer circumferential surface of the partially cylindrical portion. When the rotation stopper portion abuts the sleeve and an inner circumferential surface of the cam guide abuts the parking cam, rotation of the cam guide with respect to the sleeve is restricted.

3 Claims, 8 Drawing Sheets

(56) References Cited

U.S. PATENT DOCUMENTS

2014/0231213 A1\* 8/2014 Isomura ............. F16H 63/3425
                                                192/219.5
2015/0226277 A1\* 8/2015 Ishiura ................. F16D 63/006
                                                188/69

\* cited by examiner

Related Art

PARKING LOCK DEVICE

RELATED APPLICATION

The present application claims priority of Japanese Patent Application Number 2021-048964 filed on Mar. 23, 2021, which is hereby incorporated by reference herein in its entirety.

BACKGROUND

1. Field

The present disclosure relates to a parking lock device.

2. Description of Related Art

Japanese Patent No. 5240364 discloses a parking lock device. The parking lock device includes a shift control shaft that rotates depending on a switching operation of a shift position. Further, the parking lock device includes a plate-shaped detent plate that rotates in accordance with the rotation of the shift control shaft. More particularly, the detent plate can be rotated to a parking position and a non-parking position.

The parking lock device also includes a parking rod that is rotatably coupled to the detent plate. When the detent plate is rotated from the non-parking position to the parking position, the parking rod moves from the non-operating position to the operating position. A tapered parking cam is disposed at the leading end portion of the parking rod. When the parking rod moves from the non-operating position to the operating position, the parking cam lifts the parking lock pole.

When the parking cam lifts the parking lock pole, the parking lock pole rotates. As a result, a hook portion of the parking lock pole engages with the parking lock gear.

The parking lock gear rotates in conjunction with the drive gear. Therefore, the drive gear is locked by engaging the hook portion of the parking lock pole with the parking lock gear.

Figure 13:
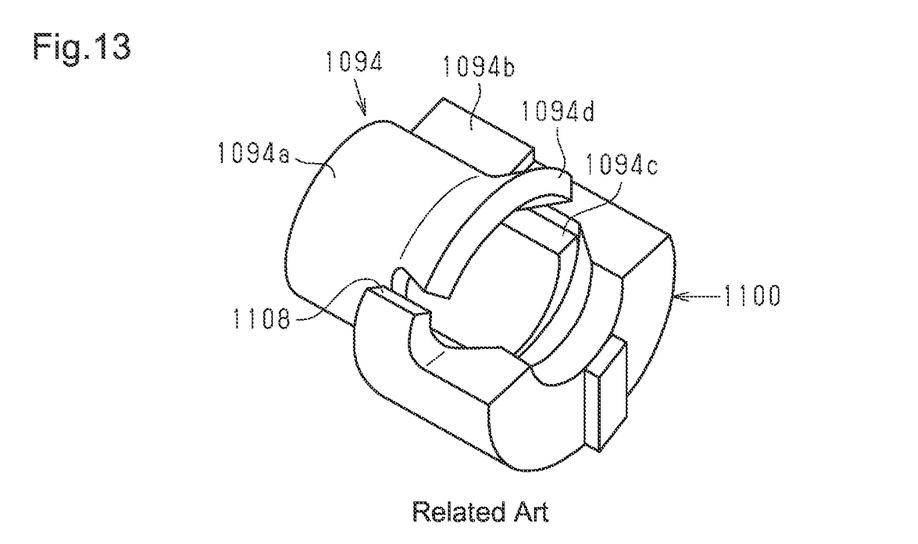
FIG. 13 is a perspective view showing a cam guide and a sleeve according to the related art.

As shown in FIG. 13, the parking lock device disclosed in Japanese Patent No. 5240364 includes a cam guide 1094 and a sleeve 1100, which guide the movement of the parking cam. FIG. 13 is a perspective view showing the cam guide 1094 and the sleeve 1100 combined with each other.

The cam guide 1094 has a cylindrical portion 1094a and a projecting portion 1094b extending radially outward from the outer circumferential surface of the cylindrical portion 1094a. Further, the cam guide 1094 has a partially cylindrical portion 1094c that extends from the leading end portion of the cylindrical portion 1094a. The partially cylindrical portion 1094c is C-shaped, and the radius of the partially cylindrical portion 1094c is the same as the radius of the cylindrical portion 1094a. Further, the cam guide 1094 has a partially tapered portion 1094d extending from the leading end portion of the cylindrical portion 1094a. In the cross section orthogonal to the central axis of the cylindrical portion 1094a, the partially tapered portion 1094d has an arc shape. The diameter of the partially tapered portion 1094d is larger so that the portion further away from the cylindrical portion 1094a is away from the center.

The sleeve 1100 accommodates the cam guide 1094. Specifically, the sleeve 1100 has an arc portion that overlaps the partially cylindrical portion 1094c.

The cam guide 1094 can rotate relative to the sleeve 1100 to some extent. The contact of the partially tapered portion 1094d with the end surface 1108 provided on the arc portion of the sleeve 1100 restricts the relative rotation of the cam guide 1094 with respect to the sleeve 1100.

In the above parking lock device, the relative rotation of the cam guide 1094 with respect to the sleeve 1100 is restricted by bringing the partially tapered portion 1094d into contact with the end surface 1108. Therefore, designing the positions, shapes, and angles of the end surface 1108 and the partially taper portion 1094d so that the end surface 1108 comes into surface contact with the partially taper portion 1094d is necessary.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, a parking lock device is provided. The parking lock device includes a parking rod that has a base end portion rotatably coupled to a detent plate and a leading end portion located opposite to the base end portion, a tapered parking cam disposed at the leading end portion of the parking rod and, a cam guiding device that is configured to guide the tapered parking cam. When the detent plate is rotated from a non-parking position to a parking position, the tapered parking cam moved together with the parking rod moves a parking lock pole rotatably disposed on a transmission case so that the parking lock pole engages with a parking lock gear rotated together with an output shaft of transmission. The cam guiding device includes a cam guide including a cylindrical portion, a partially cylindrical portion extending from a leading end portion of the cylindrical portion, a partially tapered portion extending from the leading end portion of the cylindrical portion, and a rotation stopper portion provided on the partially cylindrical portion, and a sleeve for accommodating the cam guide. The sleeve includes an arc portion that overlaps the partially cylindrical portion from an outside. A radius of the partially tapered portion increases as the partially tapered portion extends away from the cylindrical portion. The rotation stopper portion is a component that protrudes radially outward from an outer circumferential surface of the partially cylindrical portion. When the rotation stopper portion abuts the sleeve and an inner circumferential surface of the cam guide abuts the tapered parking cam, rotation of the cam guide with respect to the sleeve is restricted.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Hereinafter, the parking lock device according to one embodiment will be described with reference to the drawings.

<Outline of Transaxle Equipped with Parking Lock Device>

Figure 1:
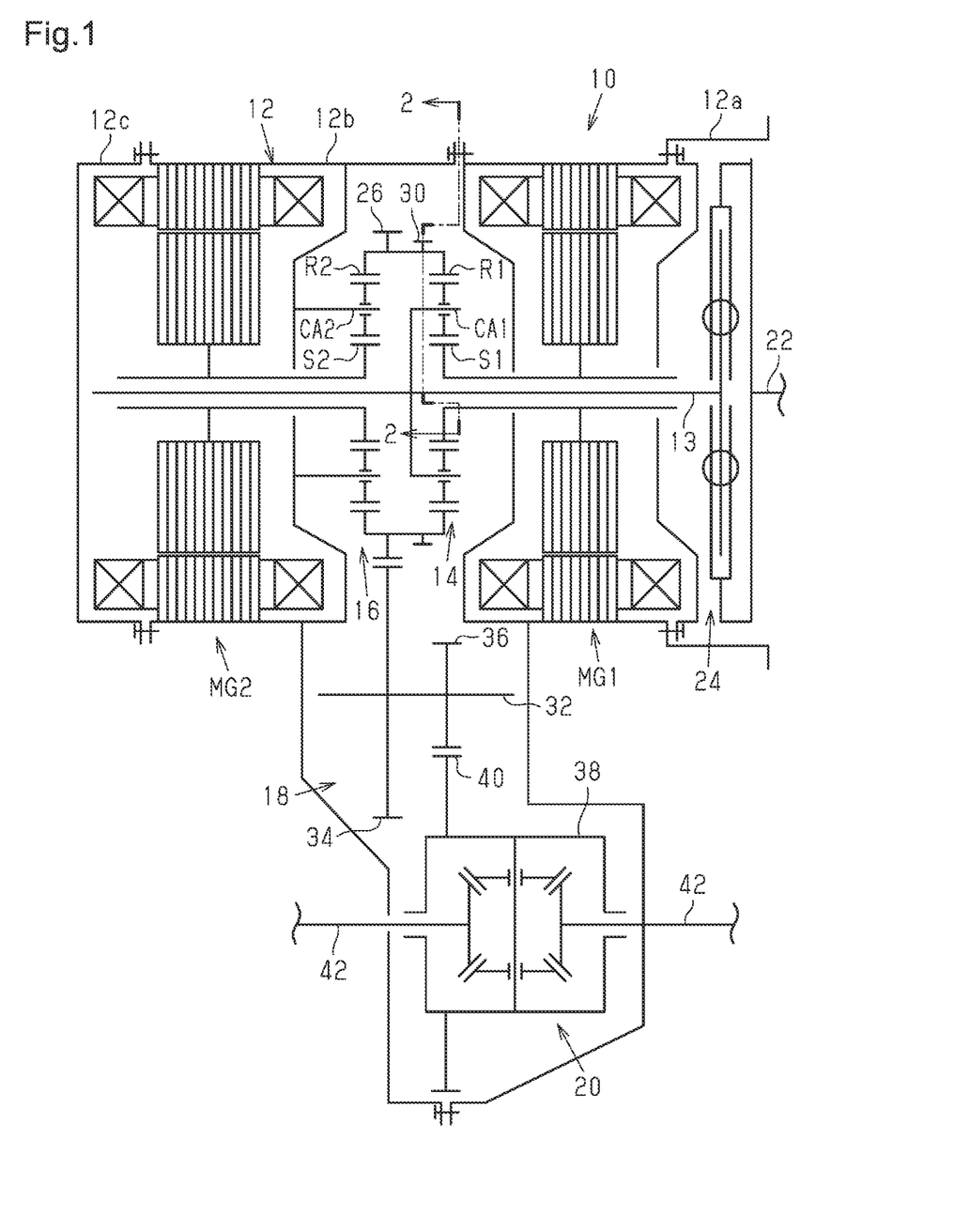
FIG. 1 is a schematic diagram for explaining a transaxle including a parking lock device according to one embodiment.

FIG. 1 is a schematic diagram for explaining a transaxle 10 including a parking lock device 28. In FIG. 1, the transaxle 10 is employed in a Front-engine Front-drive (FF) type hybrid vehicle. The transaxle 10 includes a housing 12. The housing 12 consists of a case 12a, a case 12b, and a cover 12c assembled to each other. The case 12a, a case 12b, and a cover 12c are made of, for example, die-cast aluminum. Further, the transaxle 10 includes in the housing 12 a first motor generator MG1 and a second motor generator MG2 and a first planetary gear device 14 and a second planetary gear device 16. Further, the transaxle 10 includes a reduction gear device 18 and a differential gear device 20. The first motor generator MG1 and the second motor generator MG2 serve as electric motors and electric generators. The first planetary gear device 14 and the second planetary gear device 16 are of single pinion type. The cases 12a, 12b, and the cover 12c correspond to a transmission case.

Further, the transaxle 10 includes a rotatably supported input shaft 13. The input shaft 13 is disposed concentrically with an output shaft (crankshaft) 22 of, for example, an engine not depicted that is a main drive force for running. The input shaft 13 is coupled to the output shaft 22 in a power transmittable manner via a damper device 24 for absorbing and damping pulsations due to abrupt torque variations.

The first planetary gear device 14 serves as a power distribution mechanism for mechanically distributing a torque generated by the engine to the first motor generator MG1 and the reduction gear device 18. The first planetary gear device 14 includes a carrier CA1 coupled to the input shaft 13, a sun gear S1 coupled to the first motor generator MG1, and a ring gear R1 fixedly disposed on an inner circumferential surface of a drive gear 26. The drive gear 26 corresponds to an output shaft of the transmission. A parking lock gear 30 making up a portion of a parking lock device 28 is fixedly disposed on an outer circumferential surface of the drive gear 26. The second planetary gear device 16 serves as a reduction mechanism of the second motor generator MG2. The second planetary gear device 16 includes a sun gear S2 coupled to the second motor generator MG2, a carrier CA2 coupled to the case 12b, and a ring gear R2 fixedly disposed on the inner circumferential surface of the drive gear 26.

The first motor generator MG1 is mainly used as an electric generator. The first motor generator MG1 is rotationally driven via the first planetary gear device 14 by the engine to generate an electric energy so as to charge, for example, an electric storage device such as a battery with the electric energy. The first motor generator MG1 is used not only as the electric generator but also as an electric motor at the start of the engine and during high-speed running, for example.

The second motor generator MG2 is mainly used as an electric motor and rotationally drives the drive gear 26 alone or in conjunction with the engine. The second motor generator MG2 is used not only as the electric motor but also as an electric generator during deceleration of a vehicle, for example.

The reduction gear device 18 is disposed between the drive gear 26 and the differential gear device 20 and serves as a reduction mechanism. The reduction gear device 18 includes a driven gear 34 to engage with the drive gear 26. The driven gear 34 is fixedly disposed on a counter shaft 32, which is disposed in parallel with the input shaft 13. Further, the reduction gear device 18 includes a drive gear 36 fixedly disposed on the counter shaft 32, and a driven gear 40 to engage with the drive gear 36. The driven gear 40 is fixedly disposed on a differential case 38 of the differential gear device 20.

The differential gear device 20 is of a well-known bevel gear type and respectively rotationally drives two drive shafts 42 while allowing a rotational difference.

In the transaxle 10 configured as described above, a torque is generated by at least one of the engine, the first motor generator MG1, and the second motor generator MG2. The generated torque is transmitted via the drive gear 26, the reduction gear device 18, and the differential gear device 20 to the two drive shafts 42.

<Parking Lock Device>

The parking lock device 28 will hereinafter be described in detail. The parking lock device 28 fixes the parking lock gear 30 rotated together with the drive gear 26 non-rotatably around a shaft center O1 of the parking lock gear 30. As a result, the parking lock device 28 locks the rotation of the drive shaft 42 in the transaxle 10.

Figure 2:
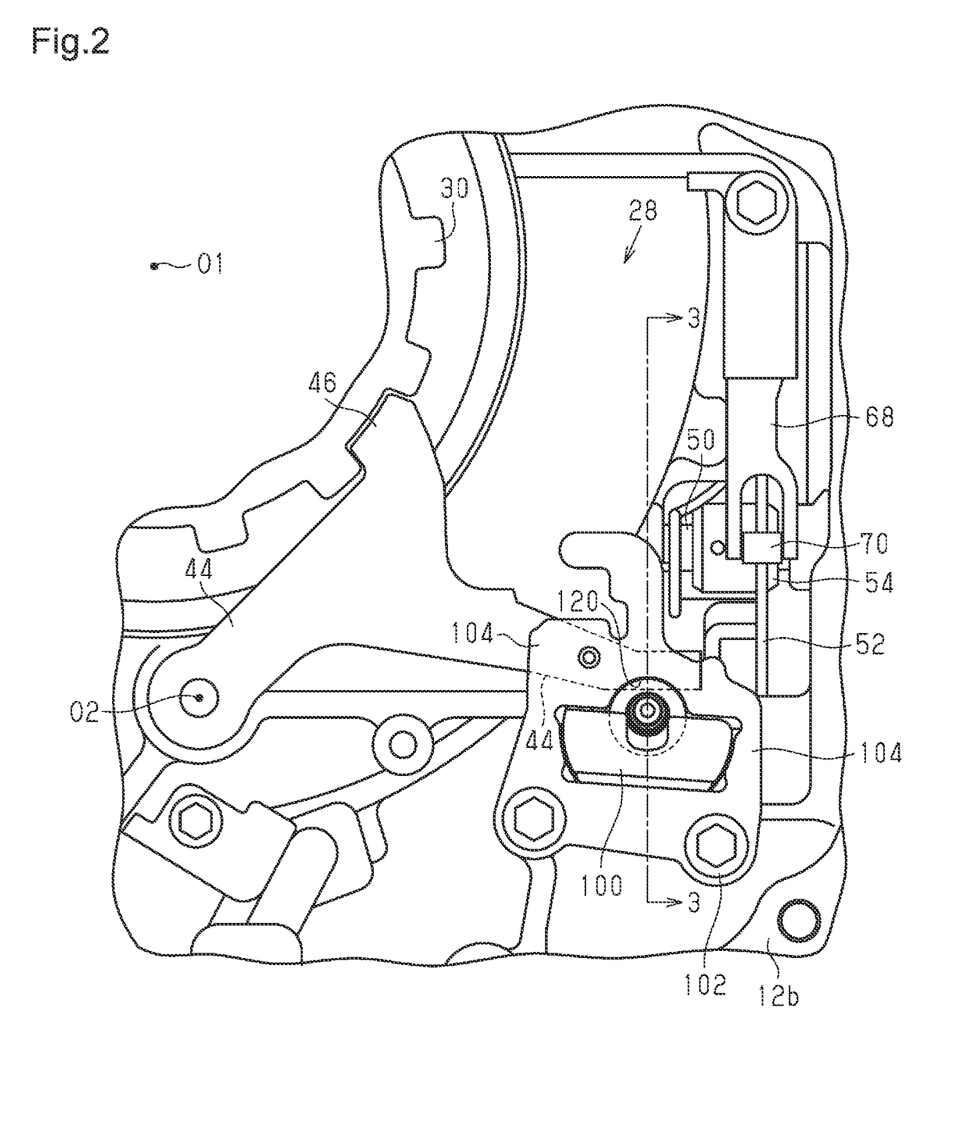
FIG. 2 is a cross-sectional view taken along the line 2-2 of FIG. 1 and shows a main part of the parking lock device.
Figure 3:
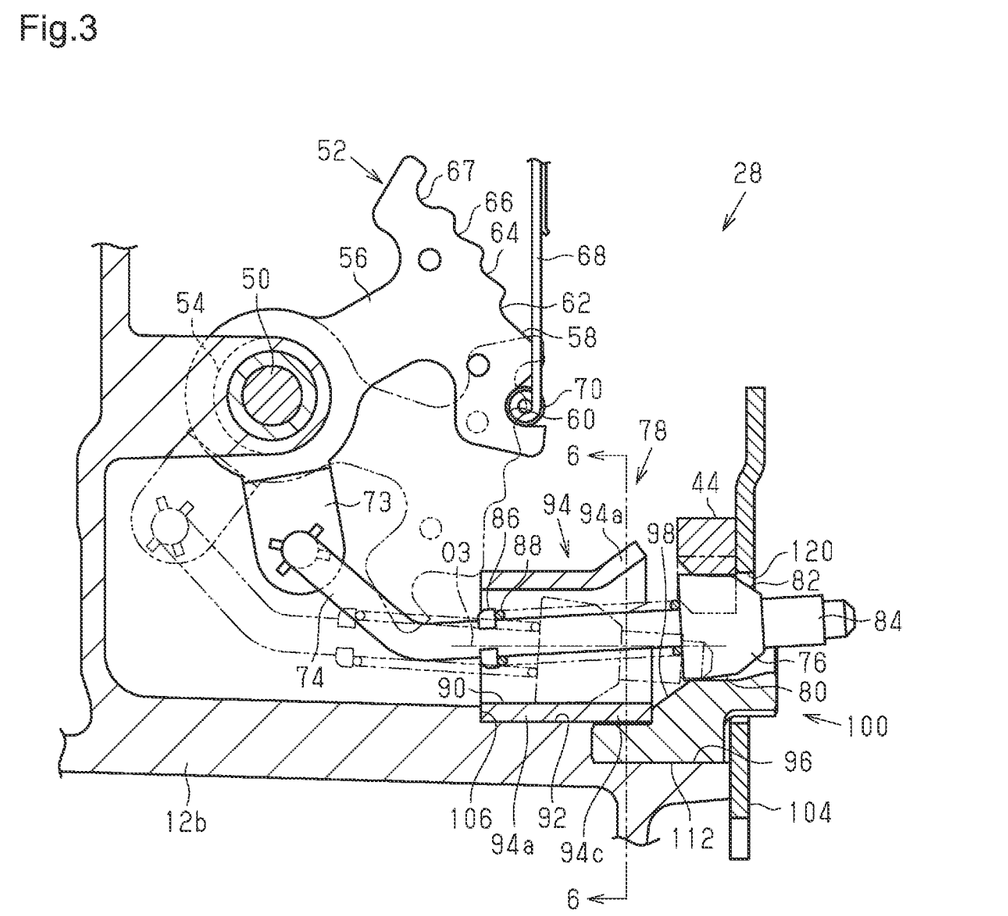
FIG. 3 is a cross-sectional view taken along the line 3-3 of FIG. 2 and shows an operating portion of the parking lock device.

FIG. 2 is a cross-sectional view taken along the line 2-2 of FIG. 1 and shows a main part of the parking lock device 28. FIG. 2 shows the main portion of the parking lock device 28 in the case 12b viewed from the opening side of the case 12b. FIG. 3 is a cross-sectional view taken along the line 3-3 of FIG. 2 and shows an operating portion of the parking lock device 28.

As shown in FIG. 2, the parking lock device 28 includes the parking lock gear 30. Further, the parking lock device 28 includes a parking lock pole 44 having a base end portion supported rotatably around a shaft center O2 by the case 12b. The parking lock pole 44 can come closer to and go away from the parking lock gear 30 as a result of the rotation around the shaft center O2. The parking lock pole 44 has a hook portion 46 that engages with the parking lock gear 30 when rotated closer to the parking lock gear 30. FIG. 2 depicts a state of the hook portion 46 of the parking lock pole 44 engaging with the parking lock gear 30. The parking lock pole 44 is rotated between an engaging position at which the parking lock gear 30 is non-rotatably fixed and a non-engagement position at which the parking lock gear 30 is allowed to rotate. FIG. 2 depicts the parking lock pole 44 at the engaging position. That is, the hook portion 46 engages with the parking lock gear 30 as a result of rotation of the parking lock pole 44 toward the parking lock gear 30. The hook portion 46 does not engage with the parking lock gear 30 as a result of rotation of the parking lock pole 44 away from the parking lock gear 30. That is, in this case, the parking lock pole 44 is located at the non-engagement position. The parking lock pole 44 is always biased toward the non-engagement position by a biasing spring (not shown) and is positioned at the non-engagement position unless an external force other than the biasing force is applied.

A shift control shaft 50 shown in FIG. 3 rotates depending on a switching operation of a shift position of the transaxle 10. The parking lock device 28 includes a plate-shaped detent plate 52 fixedly disposed on a shift control shaft 50 and rotated to any one of a plurality of preset rotation positions. The detent plate 52 is positioned at any one of preset parking, reverse, neutral, drive, and manual positions. Any one of the reverse, neutral, drive, and manual positions can be referred to as a non-parking position. The detent plate 52 includes an outer circumferential end edge equipped with a shape of a cam surface corresponding to these positions. The detent plate 52 is also referred to as a parking lever or a moderating plate. As depicted in FIG. 3, the detent plate 52 includes a boss portion 54 and a first arm portion 56 in a fan shape protruded toward the outer circumference from the boss portion 54. A first concave portion 60, a second concave portion 62, a third concave portion 64, a fourth concave portion 66, and a fifth concave portion 67 are formed on a cam surface 58 of an outer circumferential end edge portion of the first arm portion 56. The first concave portion 60 is used for positioning the detent plate 52 at the parking position. The second concave portion 62 is used for positioning the detect plate 52 at the reverse position. The third concave portion 64 is used for positioning the detent plate 52 at the neutral position. The fourth concave portion 66 is used for positioning the detent plate 52 at the drive position. The fifth concave portion 67 is used for positioning the detent plate 52 at the manual position. An engagement roller 70 abuts on the cam surface 58 and is rotatably supported by a leading end portion of a plate-shaped spring 68. The plate-shaped spring 68 has a base end portion fixed to the case 12b. The spring 68 biases the engagement roller 70 toward the cam surface 58 with a predetermined pressing force. Therefore, the detent plate 52 is positioned at the parking position when the engagement roller 70 drops into the first concave portion 60. FIG. 3 shows the detent plate 52 positioned at the parking position with a solid line. The detent plate 52 is positioned at the reverse position when the engagement roller 70 drops into the second concave portion 62. The detent plate 52 is positioned at the neutral position when the engagement roller 70 drops into the third concave portion 64. The detent plate 52 is positioned at the drive position when the engagement roller 70 drops into the fourth concave portion 66. The detent plate 52 is positioned at the manual position when the engagement roller 70 drops into the fifth concave portion 67. FIG. 3 shows the detent plate 52 positioned at the manual position with a dashed-two dotted line.

The parking lock device 28 includes a parking rod 74 that has a base end portion rotatably coupled to the detent plate 52 and a leading end portion located on the opposite side of the base end portion. The base end portion of the parking rod 74 is rotatably coupled to a second arm portion 73 protruding toward the outer circumference from the boss portion 54 of the detent plate 52. When the detent plate 52 rotates toward the parking position, the parking rod 74 moves in the direction from the base end portion to the leading end portion. Further, the parking lock device 28 includes a tapered parking cam 76 disposed at the leading end portion of the parking rod 74, and a cam guiding device 78 that guides the parking cam 76. The cam guiding device 78 includes a cam guide 94 and a sleeve 100 for accommodating the cam guide 94. When the parking rod 74 moves in the direction from the base end portion to the leading end portion, the cam guiding device 78 guides the parking cam 76 moved together with the parking rod 74. That is, the cam guiding device 78 guides the parking cam 76 when the detent plate 52 is rotated from the non-parking position to the parking position. Thus, the parking cam 76 moves the parking lock pole 44 rotatably disposed on the case 12b to an engagement position so that the parking lock pole 44 engages with the parking lock gear 30 rotated together with the drive gear 26.

The parking rod 74 is protruded from the inside of the case 12b toward an opening portion of the case 12b closer to the first motor generator MG1, when the detent plate 52 rotates toward the parking position. FIG. 3 shows the parking rod 74 and the detent plate 52 with dashed-two dotted lines when the detent plate 52 is positioned at the manual position. FIG. 3 shows the parking rod 74 and the detent plate 52 with solid lines when the detent plate 52 is positioned at the parking position.

The parking cam 76 includes a first tapered cam surface 80 formed into a tapered shape having a relatively shallow slope with a diameter reduced toward the leading end of the parking rod 74. Further, the parking cam 76 includes a second tapered cam surface 82 disposed adjacently to the first tapered cam surface 80. The second tapered cam surface 82 is formed into a tapered shape having a relatively steep slope with a diameter reduced toward the leading end of the parking rod 74. The parking cam 76 is a cylindrical member fitted to the leading end of the parking rod 74. A cylindrical stopper 84 is fitted to the leading end portion of the parking rod 74. The cylindrical stopper 84 is adjacent to the parking cam 76. A caulking portion 86 is formed closer to the base end portion of the parking rod 74. The parking cam 76 is biased toward the stopper 84 by a coil spring 88 interposed in a pressurized state between the caulking portion 86 and the parking cam 76.

Figure 4:
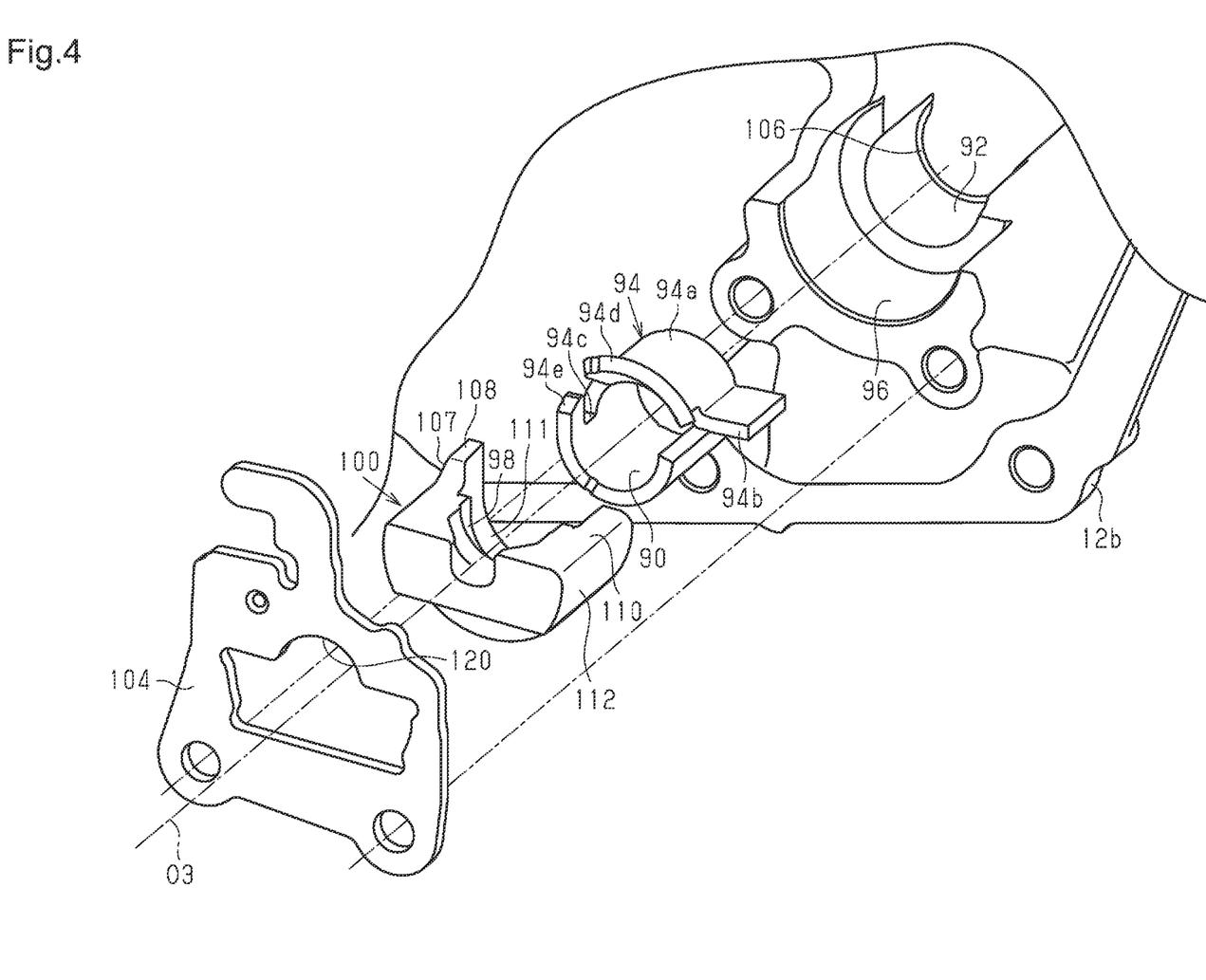
FIG. 4 is an exploded perspective view of the cam guide, the sleeve, and the stopper plate sequentially assembled into the opening of the case shown in FIG. 3.

As shown in FIGS. 3 and 4, in the case 12b, a first receiving surface 92 is formed into a cylindrical surface shape, and a second receiving surface 96 having a larger diameter than the first receiving surface 92 is formed. The second receiving surface 96 is formed adjacently to the first receiving surface 92 on the opening side of the case 12b and has a shaft center O3 in common with the first receiving surface 92. The cam guide 94 includes an inner circumferential surface 90 for guiding the parking cam 76. The cam guide 94 is cylindrical is fitted into the first receiving surface 92 formed into a cylindrical surface shape in the case 12b, so as not to move in a radial direction, i.e., in a direction orthogonal to the shaft center O3. The sleeve 100 is received from a position on the side opposite to the parking lock pole 44 by the second receiving surface 96 adjacent to the first receiving surface 92 on the opening side of the case 12b. The movement of the sleeve 100 toward the parking lock pole 44 is restricted by the cam guide 94. The sleeve 100 is disposed adjacently to the cam guide 94 on the opening side of the case 12b. The sleeve 100 is half cylindrical and has a tapered guiding concave surface 98. The tapered guiding concave surface 98 guides the parking cam 76 toward the parking lock pole 44, when the detent plate 52 rotates from the reverse position to the parking position. Further, as shown in FIG. 2, a stopper plate (fixing member) 104 is fixed to the opening portion of the case 12b by bolts 102, for example, and engaged with an end portion of the sleeve 100. Thus, the stopper plate 104 restricts the rotation of the sleeve 100 around the shaft center O3 and the movement toward the opening portion of the case 12b.

Figure 5:
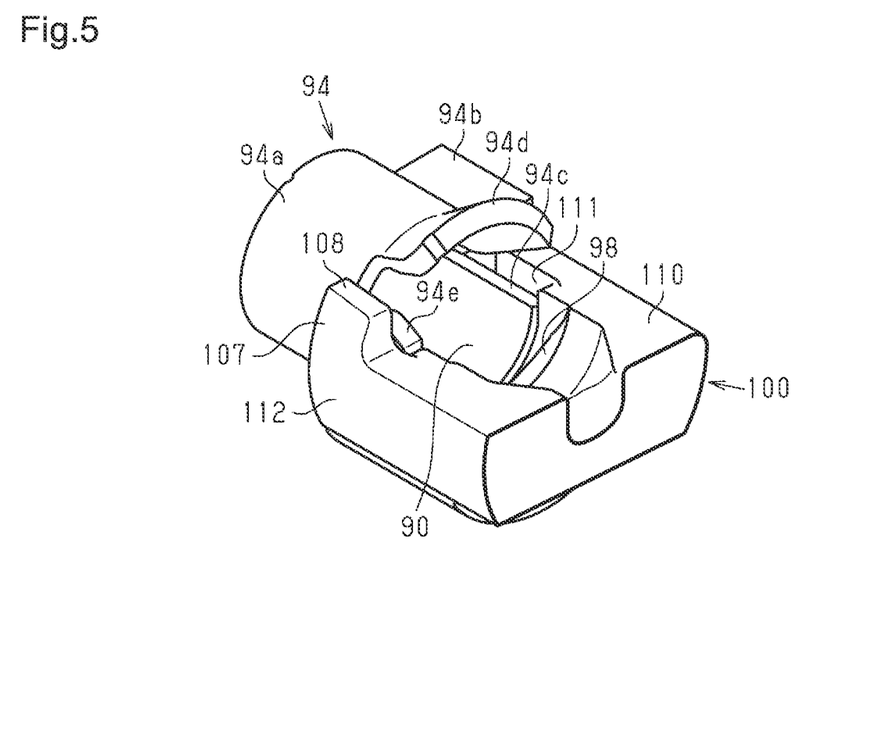
FIG. 5 is a perspective view showing the cam guide and the sleeve assembled in the case shown in FIG. 3.

FIG. 4 is an exploded perspective view of the cam guide 94, the sleeve 100, and the stopper plate 104 sequentially assembled into the opening of the case 12b. FIG. 5 is a perspective view showing only the cam guide 94 and the sleeve 100 assembled in the case 12b. As depicted in FIG. 4, the first receiving surface 92 is formed into a partially cylindrical surface of about 240° around the shaft center O3, which is a direction parallel to the shaft center O1 of the parking lock gear 30. The second receiving surface 96 is formed adjacently to the first receiving surface 92 in the shaft center O3 direction and concentrically with the first receiving surface 92. The second receiving surface 96 is formed such that a radius r2 of the second receiving surface 96 is larger than a radius r1 of the first receiving surface 92. The first receiving surface 92 and the second receiving surface 96 are formed by performing the finish cutting machining to the case 12b made of die-cast aluminum with a cylindrical rotary blade such as an end mill, for example.

<Details of Cam Guide Provided by Parking Lock Device>

The cam guide 94 includes a cylindrical portion 94a and a projecting portion 94b in a flat plate shape. Further, the cam guide 94 includes a partially cylindrical portion 94c extending from a leading end portion of the cylindrical portion 94a, and a partially tapered portion 94d extending from the leading end portion of the cylindrical portion 94a. Further, the cam guide 94 includes a rotation stopper portion 94e provided on the partially cylindrical portion 94c.

The cylindrical portion 94a is located in the cam guide 94 on the opposite side of the sleeve 100. A radius of the cylindrical portion 94a viewed from the shaft center O3 substantially identical to the radius r1 of the first receiving surface 92. The cylindrical portion 94a is received by the first receiving surface 92.

The projecting portion 94b has the same width dimension as the dimension of the cylindrical portion 94a in the direction of the shaft center O2 and radially projects from the cylindrical portion 94a toward the outer circumference.

The partially cylindrical portion 94c of the cam guide 94 has a semicircular shape and is located on the side corresponding to the sleeve 100. A radius of the partially cylindrical portion 94c viewed from the shaft center O3 is unchanged. That is, the radius of the partially cylindrical portion 94c is identical to the radius r1 of the cylindrical portion 94a.

A radius of the partially tapered portion 94d increases as the partially tapered portion 94d extends away from the cylindrical portion 94a. In other words, the radius of the partially tapered portion 94d as viewed from the shaft center O3 increases as the partially tapered portion 94d approaches the stopper plate 104. Thus, the cam guide 94 is less likely to interfere with the parking cam 76 guided toward the parking lock pole 44 by the tapered guiding concave surface 98. The cylindrical portion 94a abuts a stepped-portion end surface 106 formed at an edge of the first receiving surface 92. Further, the partially cylindrical portion 94c protrudes from the first receiving surface 92. In other words, the length of the cam guide 94 in the shaft center O3 direction is formed longer than the length of the first receiving surface 92 in the shaft center O3 direction. In this embodiment, the cam guide 94 is made of one plate material bent by press working.

The rotation stopper portion 94e is a component that protrudes radially outward from the outer circumferential surface of the partially cylindrical portion 94c. More particularly, the rotation stopper portion 94e includes a surface connected to the outer circumferential surface of the partially cylindrical portion 94c. The surface of the rotation stopper portion 94e extends linearly along the tangent line of the outer circumferential surface of the partially cylindrical portion 94c from the portion connected to the outer circumferential surface. As will be described later, when the rotation stopper portion 94e abuts the sleeve 100 and the inner circumferential surface 90 of the cam guide 94 abuts the parking cam 76, the rotation of the cam guide 94 with respect to the sleeve 100 is restricted.

<Details of Sleeve Provided by Parking Lock Device>

The sleeve 100 includes an arc portion 111 that overlaps the partially cylindrical portion 94c of the cam guide 94 from the outside.

The arc portion 111 is formed into a partially cylindrical shape of about 180°. The arc portion 111 is fitted into a semi-annular gap formed between the second receiving surface 96 and the partially cylindrical portion 94c of the cam guide 94. The arc portion 111 is overlapped with the partially cylindrical portion 94c of the cam guide 94. This restricts the movement of the sleeve 100 toward the parking lock pole 44.

A protrusion 107 is arranged on the arc portion 111 of the sleeve 100. The protrusion 107 and the arc portion 111 are lined up in the circumferential direction of the arc portion 111. The protrusion 107 extends vertically from the arc portion 111. The outer surface of the protrusion 107 comes into surface contact with the second receiving surface 96 of case 12b. That is, the outer surface of protrusion 107 is arcuate. The inner surface of the protrusion 107 has a linear shape. As will be described later, when the surface of the rotation stopper portion 94e abuts the protrusion 107, the rotation of the cam guide 94 with respect to the sleeve 100 in the counterclockwise direction around the shaft center O3 is restricted. Further, when the parking lock pole 44 moves violently in the cam guiding device 78, the protrusion 107 is pressed against the case 12b. That is, the protrusion 107 can restrict the movement of the cam guiding device 78 with respect to case 12b. When the projecting portion 94b abuts the case 12b, the rotation of the cam guide 94 with respect to the sleeve 100 in the clockwise direction around the shaft center O3 is restricted. This is different from the configuration of the related-art document in which the component corresponding to the partially tapered portion 94d restricts the rotation by contacting the portion corresponding to the end surface 110.

Further, the sleeve 100 includes an end portion that is connected to the arc portion 111 and located on the side opposite to the cam guide 94. The end portion of the sleeve 100 includes the tapered guiding concave surface 98 at the inner side. The sleeve 100 includes an outer circumferential surface 112. A radius of the outer circumferential surface 112 substantially identical to the radius r2 of the second receiving surface 96. A center line of tapered guiding concave surface 98 is displaced by a predetermined distance toward the parking lock pole 44 from the shaft center O3 that is identical to a center line of the outer circumferential surface 112. The sleeve 100 is molded by sintering (powder metallurgy), for example.

The stopper plate 104 includes a restricting hole 120 that interferes with the parking cam 76 guided toward the parking lock pole 44 when the detent plate 52 is rotated to the parking position. That is, the restricting hole 120 restricts a lifted amount of the parking cam 76. As shown in FIG. 2, the stopper plate 104 is fixed to the case 12b by the bolts 102. Further, the sleeve 100 is located within the restricting hole 120. Thus, the rotation of the sleeve 100 around the shaft center O3 is restricted.

<Operation Related to Locking and Unlocking Rotation in Transaxle>

When the detent plate 52 is rotated to the manual position as indicated by the dashed-two dotted line in FIG. 3, the parking cam 76 does not lift the parking lock pole 44. Thus, the parking lock pole 44 is positioned at the non-engagement position as indicated by a dashed-two dotted line in FIG. 3. Further, when the detent plate 52 is rotated to other non-parking positions (the drive position, the neutral position, or the reverse position), the parking cam 76 does not lift the parking lock pole 44. When the detent plate 52 is rotated to the parking position as indicated by the solid line in FIG. 3, the parking cam 76 lifts the parking lock pole 44. Thus, the parking lock pole 44 is positioned at the engagement position as indicated by a solid line in FIG. 3 against the biasing force of the biasing spring.

<Restriction of Movement of Sleeve Toward Parking Lock Pole>

As shown in FIG. 3, the sleeve 100 is overlapped with the cam guide 94. The cam guide 94 is located between the sleeve 100 and the parking lock pole 44. Thus, the movement of the sleeve 100 toward the parking lock pole 44 is restricted. Additionally, since the outer circumferential surface 112 of the sleeve 100 is fitted into the second receiving surface 96, the movement of the sleeve 100 toward the parking lock pole 44 is restricted.

<Operation of Embodiment>

Figure 6:
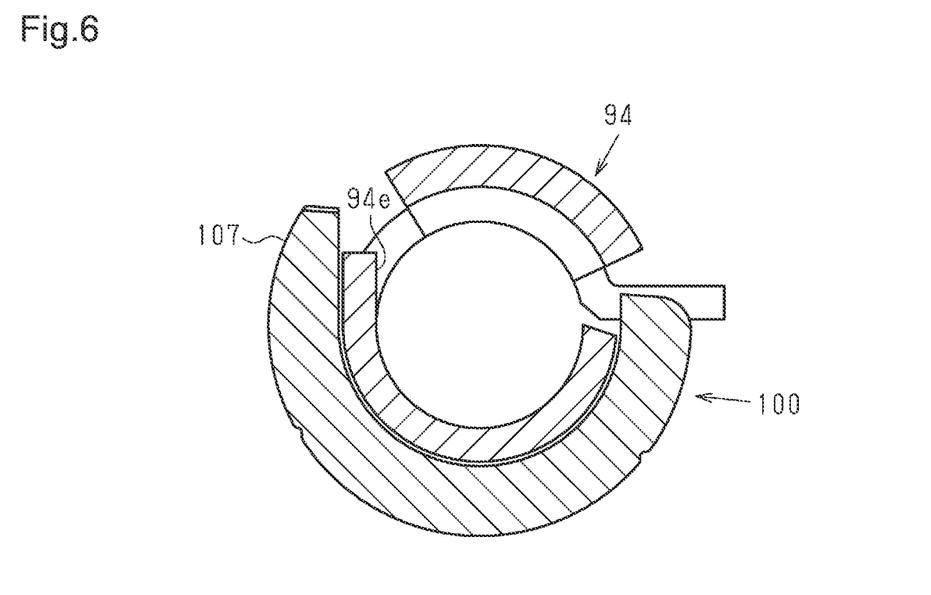
FIG. 6 is a cross-sectional view taken along the line 6-6 of FIG. 3, showing only the cam guide and the sleeve.
Figure 7:
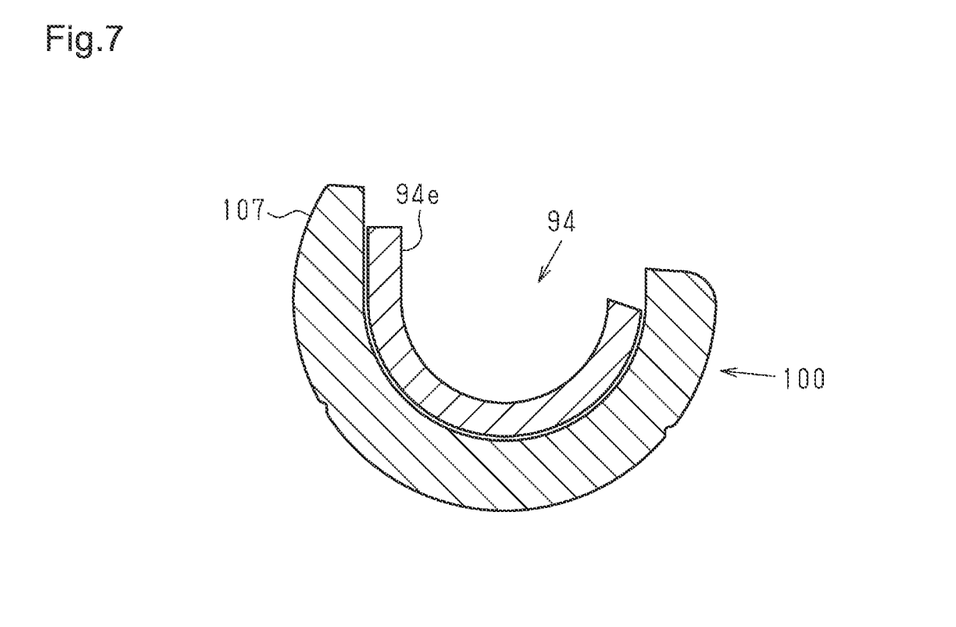
FIG. 7 is a schematic view showing the relationship between the sleeve and the cam guide.
Figure 8:
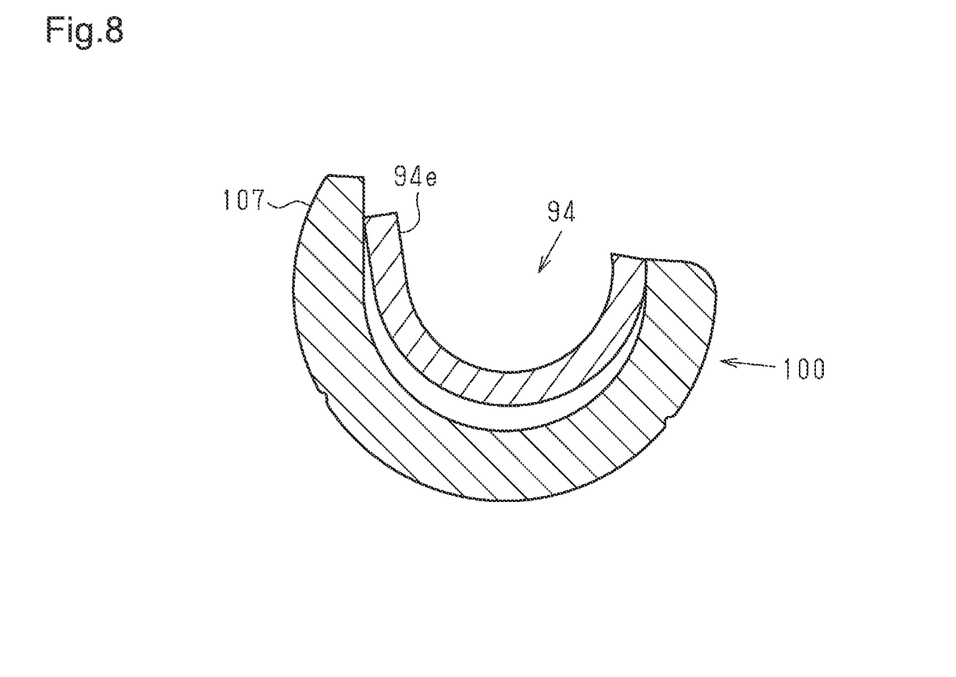
FIG. 8 is a schematic view showing a state in which the cam guide is rotated with respect to the sleeve from the state shown in FIG. 7.

FIG. 6 is a cross-sectional view taken along the line 6-6 of FIG. 3, showing only the cam guide 94 and the sleeve 100. The operation of the embodiment will be described with reference to FIGS. 7 and 8. FIG. 7 is a schematic view showing the relationship between the sleeve 100 and the cam guide 94. The cam guide 94 is supported from below by the sleeve 100. FIG. 8 shows a state in which the cam guide 94 is rotated with respect to the sleeve 100 from the state shown in FIG. 7.

When the cam guide 94 rotates with respect to the sleeve 100, the rotation stopper portion 94e of the cam guide 94 interferes with the sleeve 100. More specifically, the surface of the rotation stopper portion 94e abuts the protrusion 107. Thus, as shown in FIG. 8, the cam guide 94 moves away from the sleeve 100.

When the parking cam 76 is inside the cam guide 94, the cam guide 94 cannot move away from the sleeve 100. Thus, when the rotation stopper portion 94e abuts the sleeve 100 and the inner circumferential surface 90 of the cam guide 94 abuts the parking cam 76, the rotation of the cam guide 94 with respect to the sleeve 100 is restricted. More specifically, when the surface of the rotation stopper portion 94e abuts the protrusion 107 and the inner circumferential surface 90 of the cam guide 94 abuts the parking cam 76, the rotation of the cam guide 94 with respect to the sleeve 100 is restricted. This is different from the configuration of the related-art document in which the component corresponding to the partially tapered portion 94d restricts rotation by contacting the portion corresponding to the end surface 108.

<Effect of Embodiment>

(1) The sleeve 100 includes the arc portion 111 extending and overlapping along the partially cylindrical portion 94c of the cam guide 94. The cam guide 94 includes the rotation stopper portion 94e provided on the partially cylindrical portion 94c. The rotation stopper portion 94e protrudes radially outward from the arc formed by the outer circumferential surface of the partially cylindrical portion 94c. Thus, as shown in FIG. 8, when the cam guide 94 is rotated to the position where the rotation stopper portion 94e abuts the arc portion 111, the cam guide 94 moves so as to create a gap between the cam guide 94 and the sleeve 100. However, when the partially cylindrical portion 94c of the cam guide 94 is located between the sleeve 100 and the parking cam 76, the parking cam 76 located inside the cam guide 94 restricts the movement of the cam guide 94. Thus, in this case, the cam guide 94 cannot be rotated to the position where the rotation stopper portion 94e abuts the arc portion 111. That is, the rotation of the cam guide 94 with respect to the sleeve 100 is restricted by the rotation stopper portion 94e. As described above, according to the above configuration, the rotation of the cam guide 94 can be restricted without forming the end surface, which comes into surface contact with the partially tapered portion 94d of the cam guide 94, on the sleeve 100.

(2) According to the above configuration, the rotation of the cam guide 94 with respect to the sleeve 100 is restricted by the surface of the rotation stopper portion 94e abutting the protrusion 107 of the sleeve 100.

(3) The inner surface of the protrusion 107 of sleeve 100 has a linear shape. The sleeve 100 is manufactured using a mold. The sleeve 100 can be removed from the mold along the inner surface of the protrusion 107. Unlike this embodiment, in order to manufacture a sleeve having a structure in which the inner surface of the protrusion is arcuate, processing the inner surface of the protrusion into an arc shape is necessary. Thus, the sleeve 100 according to the present embodiment is easier to manufacture as compared with the configuration in which the inner surface of the protrusion is arcuate.

Modified Example

In addition, there are the following elements that can be changed in the above embodiment. The following modified examples can be implemented in combination with each other within a technically consistent range.

First Modified Example

Figure 9:
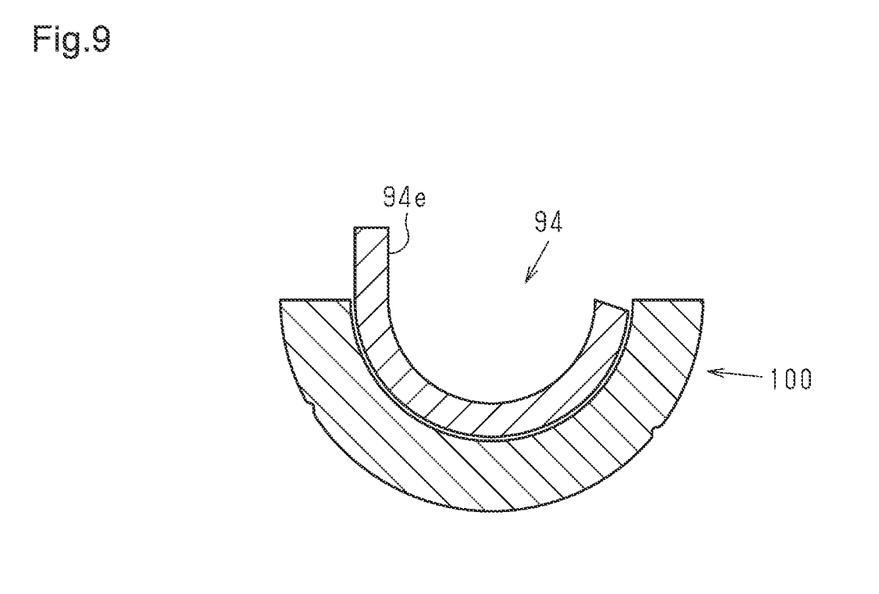
FIG. 9 is a diagram showing a first modified example in which a protrusion is not provided.
Figure 10:
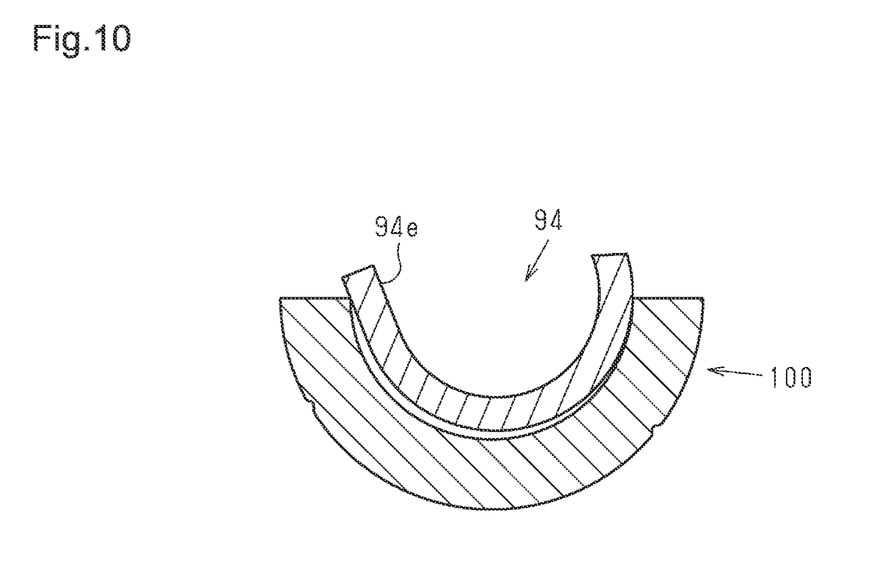
FIG. 10 is a schematic view showing a state in which the cam guide is rotated with respect to the sleeve from the state of FIG. 9.

The first modified example will be described with reference to FIGS. 9 and 10. In the first modified example, the protrusion 107 of the sleeve 100 is omitted as compared with the above embodiment. FIG. 10 shows a state in which the cam guide 94 is rotated with respect to the sleeve 100 from the state of FIG. 9.

When the cam guide 94 rotates with respect to the sleeve 100, the rotation stopper portion 94e of the cam guide 94 interferes with the sleeve 100. Thus, the cam guide 94 moves away from the sleeve 100. Thus, when the rotation stopper portion 94e abuts the sleeve 100 and the inner circumferential surface 90 of the cam guide 94 abuts the parking cam 76, the rotation of the cam guide 94 with respect to the sleeve 100 is restricted.

Second Modified Example

Figure 11:
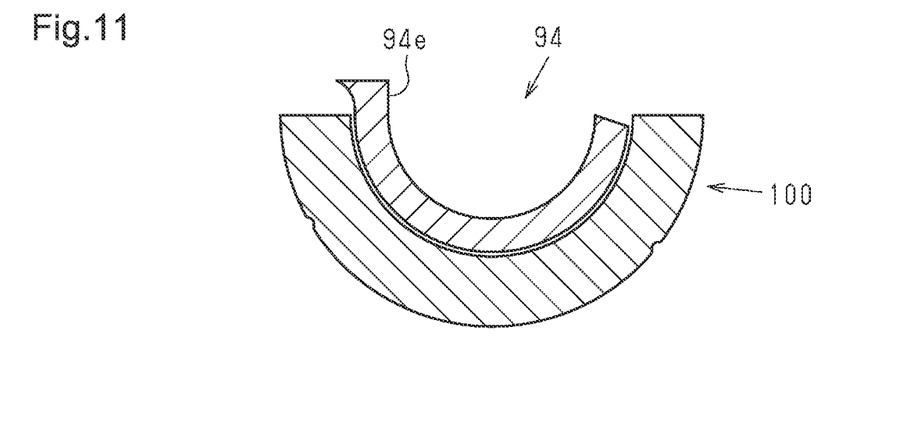
FIG. 11 is a diagram showing a second modified example, in which the rotation stopper portion is changed from the configuration shown in FIG. 9.
Figure 12:
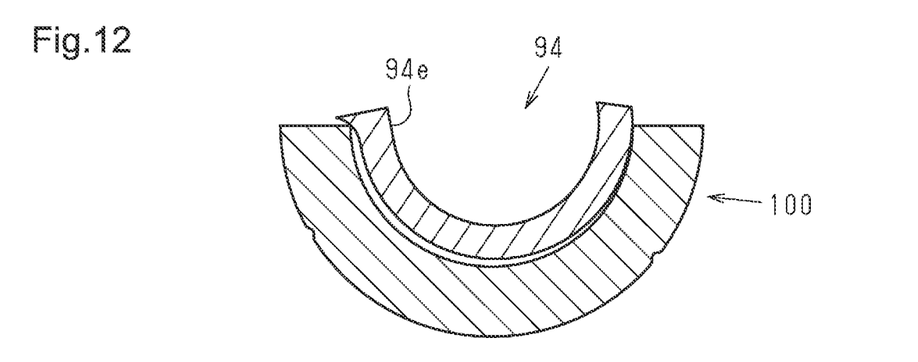
FIG. 12 is a schematic view showing a state in which the cam guide is rotated with respect to the sleeve from the state of FIG. 11.

The second modified example will be described with reference to FIGS. 11 and 12. In the second modified example, the shape of the rotation stopper portion 94e is changed as compared with the first modified example. In the rotation stopper portion 94e of the second modified example, the surface connected to the outer circumferential surface of the partially cylindrical portion 94c is a curved surface. This surface protrudes radially outward from the outer circumferential surface of the partially cylindrical portion 94c. FIG. 12 shows a state in which the cam guide 94 is rotated with respect to the sleeve 100 from the state of FIG. 11.

When the cam guide 94 rotates with respect to the sleeve 100, the rotation stopper portion 94e of the cam guide 94 interferes with the sleeve 100. Thus, the cam guide 94 moves away from the sleeve 100. Thus, when the rotation stopper portion 94e abuts the sleeve 100 and the inner circumferential surface 90 of the cam guide 94 abuts the parking cam 76, the rotation of the cam guide 94 with respect to the sleeve 100 is restricted.

Other Modified Examples

The rotation stopper portion 94e need only protrude radially outward from the outer circumferential surface of the partially cylindrical portion 94c. That is, the shape of the rotation stopper portion 94e is not limited to the shapes shown in the above-described embodiment and the first modified example and the second modified example. The shape of the rotation stopper portion 94e can be appropriately changed as long as the rotation stopper portion 94e protrudes radially outward from the outer circumferential surface of the partially cylindrical portion 94c.

In the above embodiment, the cam guide 94 is made of one plate material bent by press working. However, this is merely an example. the cam guide 94 may be manufactured with molding by powder metallurgy or may be manufactured from a steel pipe material by machining. Similarly, the manufacturing method of the sleeve 100 can be changed as appropriate.

The projecting portion 94b may be omitted.

In the above embodiment, the parking lock device 28 is disposed on the transaxle 10 of an FF type hybrid vehicle. However, this is merely an example. The parking lock device 28 may be applied to a transmission included in a vehicle of another drive type such as Front-engine Rear-drive (FR) type, for example. The parking lock device 28 may be applied to a transmission included in a vehicle that includes only an engine as a drive power source, for example. The parking lock device 28 may be applied to a transmission included in an electric vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A parking lock device comprising:
a parking rod that has a base end portion rotatably coupled to a detent plate and a leading end portion located opposite to the base end portion;
a tapered parking cam disposed at the leading end portion of the parking rod and;
a cam guiding device that is configured to guide the tapered parking cam, wherein,
when the detent plate is rotated from a non-parking position to a parking position, the tapered parking cam moved together with the parking rod moves a parking lock pole rotatably disposed on a transmission case so that the parking lock pole engages with a parking lock gear rotated together with an output shaft of transmission,
the cam guiding device includes:
a cam guide including a cylindrical portion, a partially cylindrical portion extending from a leading end portion of the cylindrical portion, a partially tapered portion extending from the leading end portion of the cylindrical portion, and a rotation stopper portion provided on the partially cylindrical portion; and
a sleeve for accommodating the cam guide,
the sleeve includes an arc portion that overlaps the partially cylindrical portion from an outside,
a radius of the partially tapered portion increases as the partially tapered portion extends away from the cylindrical portion,
the rotation stopper portion is a component that protrudes radially outward from an outer circumferential surface of the partially cylindrical portion, and
when the rotation stopper portion abuts the sleeve and an inner circumferential surface of the cam guide abuts the tapered parking cam, rotation of the cam guide with respect to the sleeve is restricted.

2. The parking lock device according to claim 1, wherein,
the rotation stopper portion includes a surface connected to the outer circumferential surface of the partially cylindrical portion, and
the surface of the rotation stopper portion extends linearly along a tangent line of the outer circumferential surface from a portion connected to the outer circumferential surface.

3. The parking lock device according to claim 2, wherein,
a protrusion is arranged on the arc portion of the sleeve, the protrusion and the arc portion are lined up in a circumferential direction of the arc portion, and the surface of the rotation stopper portion is configured to abut the protrusion.

\* \* \* \* \*